Patented Nov. 26, 1929

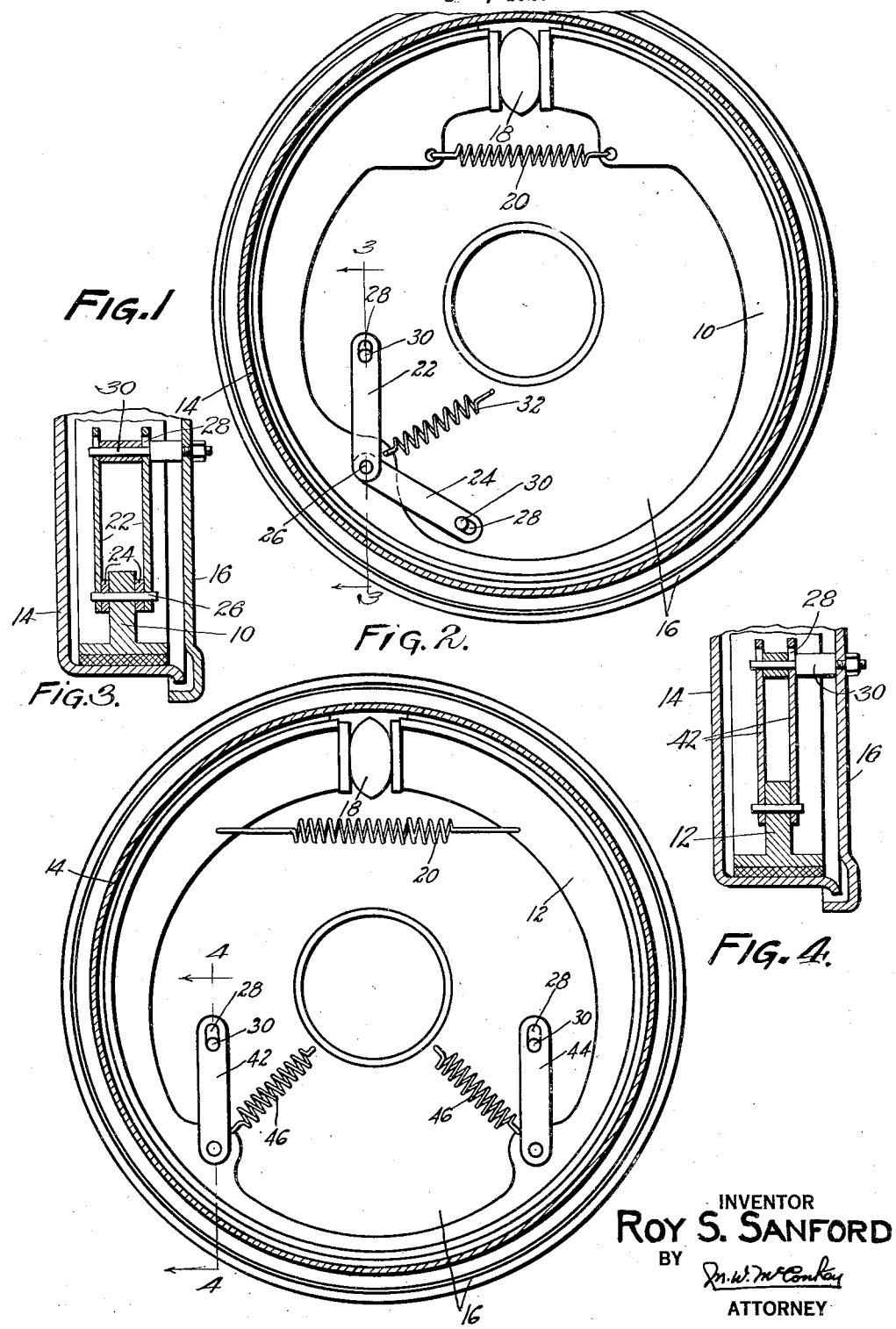

1,737,025

UNITED STATES PATENT OFFICE

ROY S. SANFORD, OF SOUTH BEND, INDIANA, ASSIGNOR TO BENDIX BRAKE COMPANY, OF CHICAGO, ILLINOIS, A CORPORATION OF ILLINOIS

BRAKE

Application filed August 1, 1925. Serial No. 47,452.

This invention relates to brakes, and is illustrated as embodied in two forms of automobile brakes. An object of the invention is to provide novel means, shown as alternatively-effective lost-motion links, between the ends of a double-wrapping or "duo-servo" friction device, and arranged to take the braking torque. Preferably the friction device is in the form of a band which tapers to provide for progressive variation in its flexibility, so that it will act smoothly.

The above and other features of the invention, including novel means for determining the anchorage of a floating band or the like, and various other novel combinations of parts and desirable particular constructions, will be apparent from the following description of the two illustrative embodiments shown in the accompanying drawing, in which:

Fig. 1 is a vertical section, just inside the wheel, through one form of the brake;

Fig. 2 is a similar section through a different form of the brake;

Fig. 3 is a partial section on the line 3—3 of Fig. 1; and

Fig. 4 is a partial section on the line 4—4 of Fig. 2.

In both brakes the friction means, shown as a double-wrapping band 10 (Fig. 1) or 12 (Fig. 2), is arranged between a drum 14 and a backing plate 16, and is expanded to apply the brake by means shown as a floating double cam 18.

Each of the bands 10 and 12 has a comparatively heavy web at its ends, which tapers gradually toward its center, to give the desired progressively-varying flexibility insuring smooth action. A return spring 20 holds the ends of each band against the cam.

In the arrangement of Fig. 1, torque is taken when the drum turns clockwise by a pair of links 22, and, when the drum turns counter-clockwise, by a pair of links 24, links 22 and 24 being pivoted to the band by the same pivot pin 26, and diverging therefrom. To provide the necessary lost motion for the idle anchor links, the links have slots 28 embracing anchor pins 30 carried by the backing plate 16. A spring 32 normally holds both sets of links in idle position, with the brake off.

In the arrangement of Fig. 2, the correponding sets of links 42 and 44 are on opposite sides of the drum diameter passing through cam 18, to secure a two-thirds "wrap" whichever way the drum is turning. Springs 46 urge the band away from the drum, with pins 30 in the lower ends of slots 28. It will be seen that springs 46 hold links 42 and 44 or their equivalents against the anchorages 30, during the first stage of applying the brake, while the ends of the band are spread apart against the drum. Thereafter, during the completion of the application of the brake, if the drum is turning clockwise the links 44 leave their anchor 30 while the torque of the entire band is transmitted to the anchorage by the links 42, or if the drum is turning counterclockwise the links 42 draw away from their anchorage and the links 44 take the torque of the entire band.

While two illustrative embodiments have been described in detail, it is not my intention to limit the scope of the invention to those particular embodiments, or otherwise than by the terms of the appended claims.

I claim:

1. A brake comprising, in combination, a drum, a brake band within the drum extending substantially the entire circumference and tapered to be of progressively varying flexibility, and a pair of devices between the ends of the band for taking the braking torque, both being arranged to engage the flexible part of the band, one being effective when the drum is turning in one direction and the other being effective when the drum is turning in the other direction.

2. A brake comprising, in combination, a drum, a brake band within the drum extending substantially the entire circumference and tapered to be of progressively varying flexibility, and a pair of lost-motion links arranged to take the braking torque and offset from the central portion of the band, one of said links engaging one side of the band where the most flexible portion merges into a comparatively inflexible portion, one being effective when the drum is turning in one direction and the other being effective when the drum is turning in the other direction.

3. A brake comprising, in combination, a drum, an expansible double-wrapping friction device within the drum having adjacent free ends, means for forcing said ends apart to apply the brake, a pair of substantially parallel lost-motion links connected to said device on opposite sides of the drum diameter passing through said means and arranged within an arc of substantially 120° and so arranged that one takes the braking torque when the drum is turning in one direction and the other takes the torque when the drum is turning in the opposite direction, said friction device being substantially unrestrained between its ends except by the two links.

4. A brake comprising, in combination, a band relatively inflexible at its ends and tapered to form a relatively flexible center portion, and torque-taking means engaging said band at one side of the center portion.

5. A brake comprising, in combination, a drum, a continuous friction member engageable with the drum and having ends which are separable to apply the brake and also having one part approximately 120° from one end which anchors when the drum is turning in one direction and a different part approximately 120° from the other end which anchors when the drum is turning in the other direction, applying means acting on said ends, and means for holding both of said parts anchored while the ends are being forced against the drum and then yielding to permit one of said parts to leave its anchored position to complete the application of the brake while the other of said parts takes the braking torque.

In testimony whereof I have hereunto signed my name.

ROY S. SANFORD.